June 6, 1944.  A. A. MELCHER  2,350,630
SHEET HOLDING TOOL
Filed Aug. 4, 1942
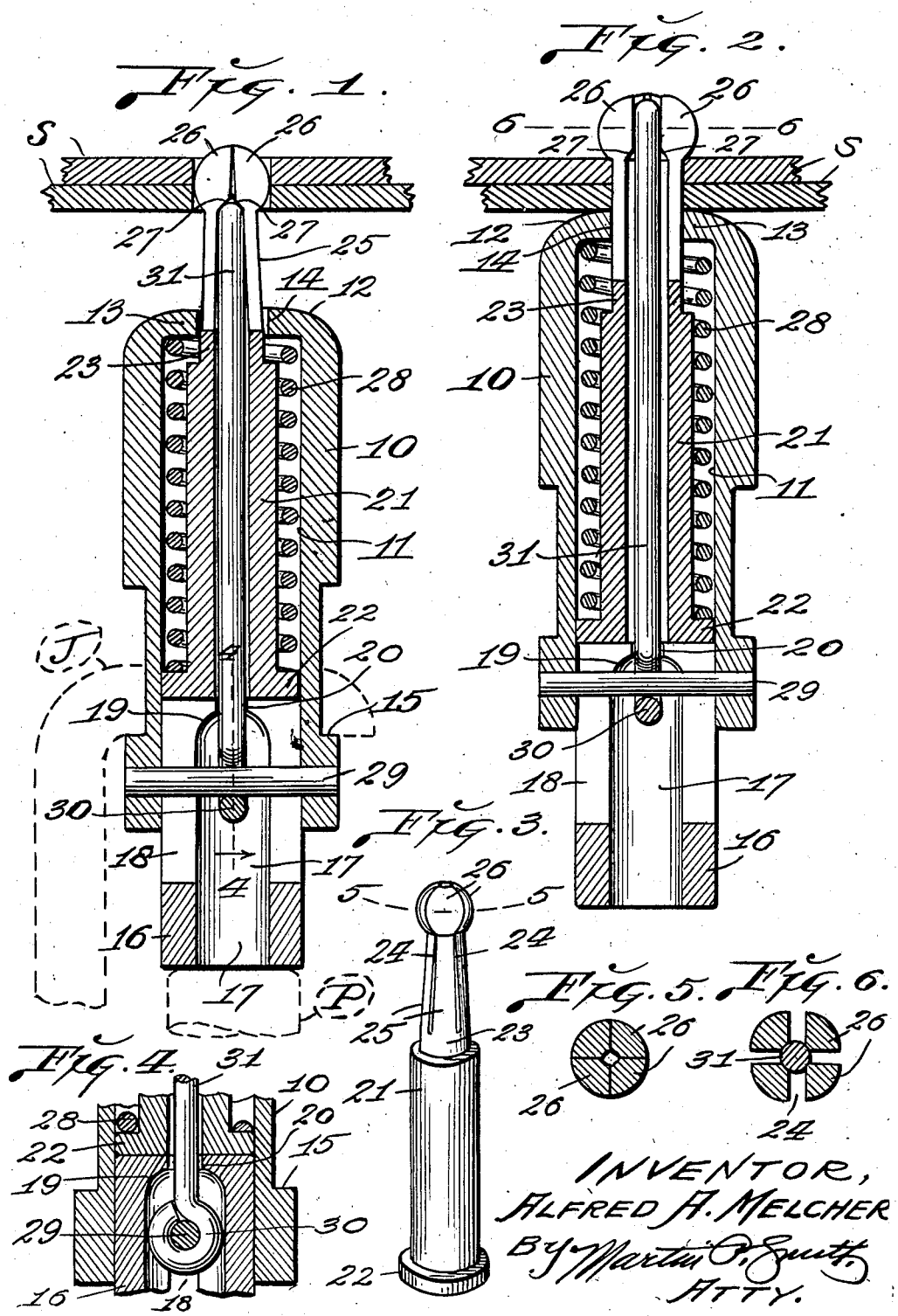
INVENTOR,
ALFRED A. MELCHER
BY Martin P. Smith
ATTY.

Patented June 6, 1944

2,350,630

UNITED STATES PATENT OFFICE 2,350,630

SHEET HOLDING TOOL

Alfred A. Melcher, Los Angeles, Calif., assignor of one-half to Francis L. Smith, Los Angeles, Calif.

Application August 4, 1942, Serial No. 453,534

4 Claims. (Cl. 85—5)

My invention relates to a tool for temporarily holding, in proper relative positions, sheets of metal which are to be secured to each other by rivets or the like, for instance, the sheets, or thin plates of metal that form the "skin" or outer sheathing of airplane bodies, each of which plates, it will be understood, is formed with a large number of rivet holes, which, when the plates are assembled for permanent connection, must register with similar rivet holes formed in another plate in order to save time, labor and consequent expense in the fabrication of the airplane or other structure of which the plates form a part.

The principal object of my invention is, to provide a simple, inexpensive and practical tool, capable of being conveniently used for rapidly effecting a temporary connection or tie between structural plates or sheets, so as to bring about registration of the corresponding rivet holes therein, thus enabling the rivets to be quickly positioned and set in the registering holes and which tool, after having served its purpose, is capable of being readily removed from the hole in which it has been positioned.

A further object of my invention is to provide a tool of the character referred to, which includes a collet having a radially expansible head which, when in contracted condition is capable of being inserted through registering rivet holes in two plates or sheets which are to be permanently connected, and after such insertion, said head is expanded radially so as to secure the collet in the registering rivet holes, thus insuring and maintaining registration of the corresponding holes in the sheets or plates and greatly expediting the work incident to riveting operations.

With the foregoing and other objects in view, my invention consists in certain novel features of construction and arrangement of parts which will be hereinafter more fully described and claimed and illustrated in the accompanying drawing, in which:

Fig. 1 is a longitudinal section taken through the center of a sheet or plate holder constructed in accordance with my invention, and showing the collapsed head of the collet in position, passing through registering rivet holes.

Fig. 2 is a sectional view similar to Fig. 1 with the collet head in expanded condition after its passage through the registering rivet holes.

Fig. 3 is a perspective view of the collet.

Fig. 4 is a detail section taken on the line 4—4 of Fig. 1.

Fig. 5 is an enlarged horizontal section taken on the line 5—5 of Fig. 3.

Fig. 6 is an enlarged horizontal section taken on the line 6—6 of Fig. 2.

Referring by numerals to the accompanying drawing which illustrates a preferred embodiment of my invention, 10 designates the body of my improved tool which is substantially cylindrical in form and provided with an axial chamber 11 of uniform diameter throughout its length. The forward end of this body is rounded as designated by 12 and provided with a finished surface so as not to scratch or mar the surfaces of the plates on which the tool is used. A flange 13 projects inwardly from the forward end of the wall of body 10, thereby providing a centrally arranged opening 14.

Formed on the lower portion of body 10 is an external shoulder 15 that is adapted to be engaged by the jaw J of a pair of specially formed pliers utilized in manipulating the tool when the same is applied to and removed from the sheets and which pliers include a plunger P which cooperates with said jaw.

Arranged to slide freely in the lower portion of the tubular body 10 is a substantially cylindrical block or plunger 16 provided with an axially disposed chamber 17, and the upper portion of said block is provided with a longitudinally disposed diametrical slot 18 which intersects chamber 17. The upper end of the chamber 17 is reduced in diameter to form shoulders 19 on those portions of the walls to the sides of slot 18, and formed in said walls above the central portions of said shoulders are notches 20.

Arranged for sliding movement within the chamber 10 and through the opening 14 in the forward end of the body is a collet comprising a tubular body 21 provided on its lower end with an external flange 22 which during relative movement between the collet and body 10 bears against the inner surfaces of the wall surrounding chamber 11.

The upper portion of the body of the collet is reduced in diameter so as to form a short cylindrical portion 23, the outer end of which terminates in a substantially spherical head. This head and cylindrical portion 23 are provided with longitudinally disposed slots 24, there being provided two slots disposed ninety degrees apart, thus forming between said slots and heads, four identical fingers 25, the outer ends of which terminate in head segments 26.

The bore through the tubular collet terminates at a point just below the head segments 26 thereby providing internally arranged inclined shoulders 27.

The slots 24 are formed in the reduced forward portion 23 of the collet while said reduced portion is in cylindrical form and after the formation of said ends, the collet is heat treated, so as to develop internal stresses which cause the outer portions of the fingers 25 and the head segments, to normally collapse or move toward each other, and to resist expansive movement. Thus the collet when finished, has the appearance as illustrated in Fig. 3, with the reduced portion 24 gradually tapering from the body 21 to the head segments 26 and with the side faces of the latter in direct contact with each other. The diameter of the collapsed heads is such that it will readily pass through the rivet holes in the plates on which the tool is used.

Surrounding the body 21 of the collet and interposed between the flange 13 and the flange 22 is an expansive spring 28 which normally tends to move the body 10 and collet in opposite directions. Seated in the lower portion of body 10 are the ends of a diametrically disposed pin 29 which passes through the slots 18 in plunger 16.

Surrounding the central portion of this pin is a loop 30 which is formed on the lower end of a rod 31, the same extending into the bore through the body of the collet and between the fingers 25.

This rod extends through the notches 20 that are formed in the shoulders 19 at the upper end of chamber 17, and said shoulders 19 provide a stop which is engaged by the loop 30 to limit the outward movement of the plunger 16 relative to the body.

It is to be noted that all of the parts of the holder are maintained in assembled relation by pin 29, and such construction provides a highly desirable safety feature, and even though the fingers 25 and head segments 26 are broken off, the parts of the device can not fly apart under the expansive forces of spring 28, and consequently eliminating possibility of injury to workmen.

Under normal conditions or before the expanded head is inserted through registering rivet holes in a pair of plates or the like, body 10 and plunger 16 are forced in opposite directions under the influence of spring 28, and under such conditions, the shoulders 19 at the upper end of plunger 16 bear against the upper portion of loop 30 with the expansible head comprising the segments 26 occupying a position just beyond the rounded end 12 of body 10, and with the end of rod 31 between the segments so that the same are expanded.

To insert the expansible head of the tool through registering rivet holes to tie a pair of plates together and bring into registration the corresponding rivet holes so as to facilitate riveting operations, the jaw J of the pliers used for manipulating the tool is positioned against shoulder 15 and with the plunger P of said pliers bearing against the end of cylindrical block 16, as illustrated by dotted lines in Fig. 1.

The pliers are now manipulated so as to move the plunger and jaw thereof toward each other, and thus the body 10 and block 16 are correspondingly moved so as to compress spring 28 and move block 16 and collet 21 forwardly through body 10, consequently moving the expansible head away from the forward end of body 10 until the shoulders 27 within the expansible head pass the end of rod 31, which latter is attached to the rear portion of body 10 by pin 29.

As the expansible head passes beyond the end of rod 31, the resiliency in the fingers 24 will collapse the head by drawing the segments thereof radially toward each other, thus materially decreasing the diameter of the head and enabling the same to be passed through the registering rivet holes as illustrated in Fig. 1.

After the expansible head has thus been passed through the rivet holes, the pressure of the parts of the plier on the tool are relieved whereupon spring 28 acts to move the collet and plunger 16 rearwardly through body 10 and after the shoulders 27 ride past the end of rod 31, the head comprising the segments 26 expands radially beyond the connected plates and at the end of this movement, the plates or sheets are tied to each other by those portions of the resilient fingers immediately adjacent the expansible head, as illustrated in Fig. 2, with the end of body 10 bearing against the outer face of one sheet or plate, and the expanded head bearing against the outer face of the other sheet.

Thus, the plates or sheets are securely tied to each other in proper assembled relation and with the corresponding rivet holes in registration so as to facilitate the positioning and setting of the rivets.

To remove the tool from the work after riveting operations, the pliers are brought into use so as to move body 10 and plunger 16 toward each other a sufficient distance to withdraw the end of rod 31 from between the head segments which permits the latter to contract by radial movement toward each other, thus decreasing the diameter of the head to such a degree as to enable the same to be withdrawn through the rivet holes in which the tool has been positioned.

An especially desirable feature of my invention is the collet provided with the normally contracted fingers 25 and head segments 26 which are radially expansible and which structure results in a substantial increase in the size of the head at the outer end of the collet when the same is expanded, such radial expansion being a decided improvement over the spreading or wedging action of a collet which is split so as to provide only two fingers and heads.

Thus, it will be seen that I have provided a sheet holding tool that is relatively simple in construction, inexpensive of manufacture, and very effective in performing the functions for which it is intended; namely, the temporary connecting or holding of sheets or plates that are to be permanently fastened to each other by means of rivets, or the like.

It will be understood that minor changes in the size, form and construction of the various parts of my improved sheet holding tool may be made and substituted for those herein shown and described without departing from the spirit of my invention, the scope of which is set forth in the appended claims.

I claim as my invention:

1. In a sheet holding tool, a pair of telescopically associated members, the inner one of which has a normally contracted radially expansible portion which projects from the other member, said expansible portion being provided near its outer end with a shoulder, a plunger arranged for sliding movement in the rear portion of the outer one of said telescopic members and bearing against the rear end of the inner one of said members, an expansive coil spring arranged between said telescopic members, a rod extending lengthwise through the inner one of said telescopic members, the end of which rod is adapted to engage the shoulder on the expansible portion of said inner member, and means connecting the rear end of said rod with the outer one of said telescopic members, which connecting means and the rear end of said rod have sliding engagement with said plunger.

2. A sheet holding tool as set forth in claim 1 and with cooperating means within said plunger and on the rear end of said rod for limiting the forward movement of said rod relative to said plunger.

3. In a sheet holding tool, a pair of telescopically associated members, the inner one of which has a normally contracted radially expansible portion which projects from the outer member, said expansible portion being provided near its outer end with an internal shoulder, an expansive spring between said telescopic members, a plunger arranged for sliding movement in the rear portion of the outer one of said telescopic members which plunger is slotted longitudinally, a pin seated in the rear portion of the outer telescopic member, which pin passes through the slot in said plunger, a rod arranged to slide through the inner one of said telescopic members and connected to said pin and a loop formed on the rear end of said rod for the reception of said pin.

4. A sheet holding tool as set forth in claim 3 and with a shoulder within said plunger for limiting the movement of said rod in one direction.

ALFRED A. MELCHER.